Dec. 9, 1958   P. R. PAYNE   2,863,514
ROTARY WING WITH SHEAR PIN MOUNTING
Filed Jan. 18, 1955   2 Sheets-Sheet 1

*Inventor*
Peter Rowland Payne
By Michael S. Striker
Agt.

Dec. 9, 1958   P. R. PAYNE   2,863,514
ROTARY WING WITH SHEAR PIN MOUNTING
Filed Jan. 18, 1955   2 Sheets-Sheet 2

United States Patent Office 2,863,514
Patented Dec. 9, 1958

2,863,514

ROTARY WING WITH SHEAR PIN MOUNTING

Peter Rowland Payne, Rearsby, England, assignor to Auster Aircraft Limited, Rearsby, England Application January 18, 1955, Serial No. 482,597

Claims priority, application Great Britain January 18, 1954

4 Claims. (Cl. 170—160.56)

This invention is for improvements in or relating to rotary wing aircraft and is concerned more particularly with the problem of avoidance of excessive stresses developing on rotary blades due to drag forces set up by the air stream. It is known that such drag forces on the rotor blades during flight may vary considerably and that in exceptional circumstances may be so great as to fracture the root ends of solid blades of normal light weight design. To design a blade capable of withstanding such excessive forces would increase the weight of the rotor abnormally and consequently it has been the practice to hinge the blade on its supporting stem about an axis parallel to that of the rotor so that the drag forces on the blade will merely cause swinging movement of the blade about the said hinge, which is commonly known as a "drag hinge." The blade is kept in extended position by the action of centrifugal force and in practice blades with drag hinges will during flight move about the drag hinge in a manner determined by the resultant of the centrifugal and in-plane forces. With such a construction there is however some tendency for the blade to oscillate about the drag hinge in such a way as to set up dangerous reactions and this is the case even where the drag hinge is provided with means to dampen and to limit the extent of the vibrations. Critical times when such undesirable conditions may arise are during landing and takeoff, at which times vibrations may be set up in the undercarriage and fuselage such as may couple with vibrations of the rotary wing blades and a build-up of vibrations may cause serious damage to the aircraft. The object of the present invention is to provide improvements in rotary wing aircraft whereby, without requiring the blades to be designed to withstand excessive drag forces, vibration of the blades is reduced or eliminated during normal flying conditions and, should the blades be subjected to excessive drag forces, they will in such exceptional circumstances be permitted to turn about their drag hinges in known manner and thus eliminate danger of fracture of their root ends.

In accordance with the invention a blade of a rotary wing is anchored to a stem portion on which the blade is mounted by a pivotal connection having an axis of pivoting extending in the general direction of the rotational axis of the rotor, and a shear member is provided between said blade and stem to hold the blade against movement about its pivotal anchorage and thereby reduce or eliminate vibration of the blade during normal flying operations. The shear member is arranged to have less resistance against fracture than has the blade or stem so that during flight, should an excessive drag force occur, the shear member will be fractured and the blade will thereafter behave as one mounted on a normal drag hinge. By the behaviour of the aircraft in flight the pilot will become aware that the shear member has broken and will recognise the need for exerting extreme care in landing. In practice the excessive drag forces such as would fracture the shear member will only arise in comparatively rare circumstances. If and when they do arise the safety of the aircraft when in flight is ensured and on landing the fractured shear member can readily be replaced.

In a preferred arrangement the shear member is connected to the said blade and stem by extending into throughways therein desirably at a location displaced radially from the pivot of the blade to the stem.

A preferred form of mounting arrangement for the blade of a rotary wing for aircraft is illustrated by way of example in the accompanying drawings and will now be described with reference to the drawings in which Figure 1 is a plan view of a mounting arrangement for a rotary wind blade, with certain parts shortened and others broken away;

Figure 1:
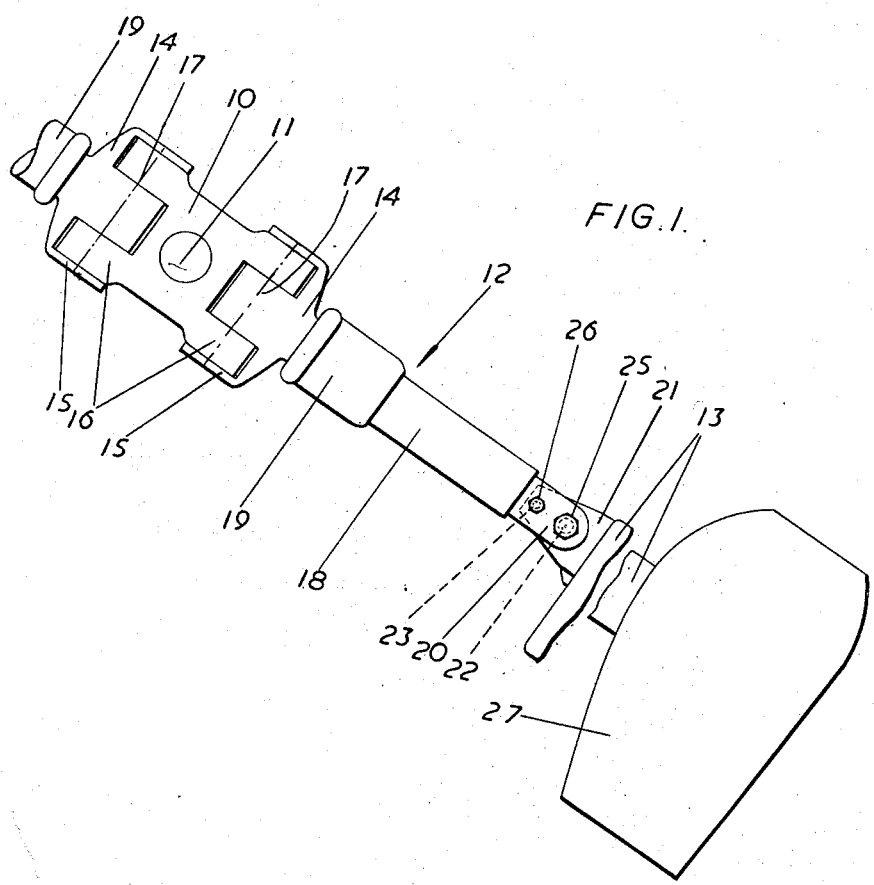
Figure 3:
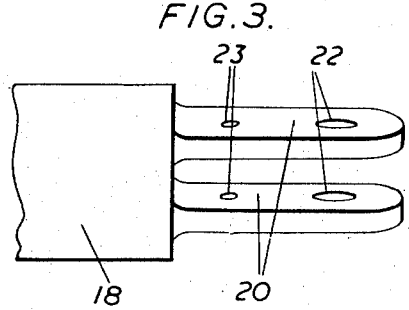
Figures 3 and 4 are detail views on a larger scale than Fig. 1 showing respectively the outer end of the stem and the inner end of the blade.

The invention is shown as applied to the rotary wing blades of a helicopter but is also applicable to similar blades used on gyroplanes. The rotor may have as many blades as desired, a two blade assembly being shown in the drawings with the blades diametrically opposite, one of the blades being omitted from the drawing. The assembly comprises a centre mounting or boss 10 arranged to rotate about the axis of the rotor spindle, such axis being indicated in plan by the point 11 in Fig. 1, the mounting 10 carrying rotor wing blade stems indicated generally at 12 supporting the blades proper one of which is shown at 13. The tip of each blade 13 may carry a jet reaction unit as indicated at 27 for propulsion of the rotor. Each stem 12 comprises an inner portion 14 formed with spaced lugs 15 interfitting with lugs 16 on the centre mounting 10. A pivot rod indicated diagrammatically at 17 passes through the lugs so that the stem 12 is pivoted to the centre mounting 10 about an axis at right angles to the rotor axis 11 and at right angles to the length of the blade 13. The blade stem 12 also comprises a portion 18 to which is secured a bearing housing 19 surrounding a portion of member 14 and mounted thereon on anti-friction bearings for rotational adjustment about an axis extending longitudinally of blade 13 to permit adjustment of the pitch of the blade.

Figure 2:
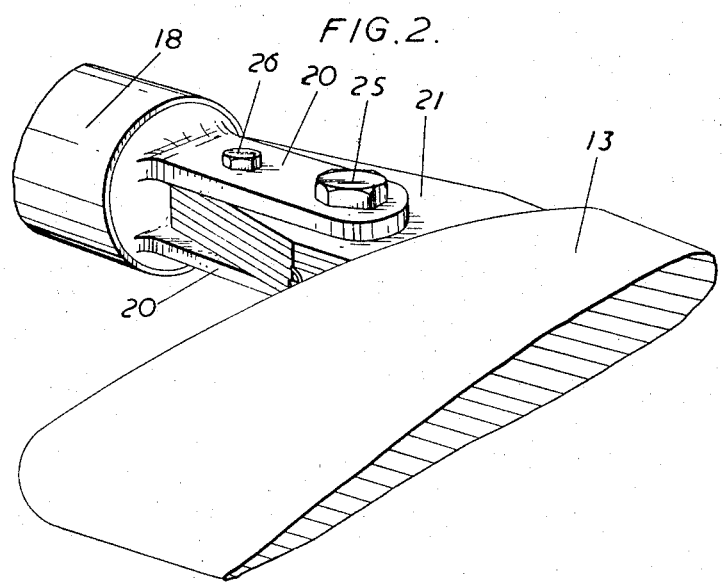
Figure 2 is a perspective view on a larger scale showing the pivotal connection between the blade and its stem.
Figure 4:
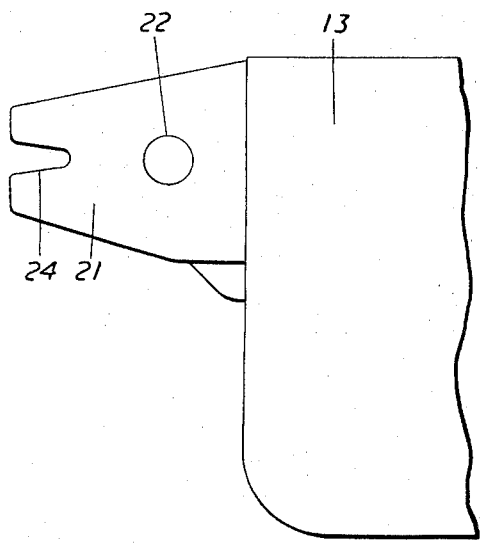

Extending outwardly from member 18 of the stem 12 are two spaced lugs 20 to which the inner end of the blade 13 is attached. The inner end of the blade has a tapering plate like projection 21 to engage between the lugs 20. Bolt holes 22 are formed in the lugs 20 and projection 21 to receive an attachment bolt (which as later indicated can form the pivot of a drag hinge) and further smaller bolt holes 23 are formed in the lugs 20 at positions displaced radially from the axis of holes 22 in a direction inwardly towards the rotor axis, the holes 23 normally being in registry with a notch or recess 24 in the projection 21. Fig. 2 shows the heads of bolts 25 and 26 which are passed through the holes 22 and 23 respectively to attach a wing blade 13 to its stem 12. The bolt 25 constitutes the drag hinge pin and the bolt 26 forms the shear member or pin which normally prevents any movement of the blade about the drag hinge pin. The shear pin is to be fractured when subjected to drag forces exerted in the blade 13 exceeding a safe value but substantially less than those which would fracture the blade 13 or the parts on which it is mounted. If and when the bolt 26 is sheared the bolt 25 functions as the pivot of a drag hinge, and unless and until the bolt 26 is sheared this bolt holds the blade 13 against turning movement on the bolt 25 and thereby reduces or eliminates vibration of the blade.

When an aircraft embodying a rotor blade assembly as above described is in flight the bolt 26 will serve as a rigid connection between its rotor blade and the stem thereof and serve to resist normal rotational stresses acting on the blade about its pivot due to air pressure in the case of gyroplanes or to the resultant effects of air pressure and propulsion as by a wing tip propulsion unit in the case of helicopters. Should such forces or resultant forces on the blade due to exceptional circumstances rise to a magnitude approaching dangerous proportions fracture of the bolt 26 by shearing will occur before damage to the blade or its stem can result. Thereafter the bolt 25 will form the pivot of a drag hinge and the position of the blade proper in relation to a radial line extending from its rotational axis will be determined by the resultant of drag and centrifugal forces. The blade proper will be permitted to move about the drag hinge and by the behaviour of the aircraft in flight the pilot will be warned to exert extreme care in landing so as to avoid the dangers previously mentioned. After landing the sheared bolt 26 can readily be replaced by a fresh bolt so that the blade is again prevented from turning about the bolt 25.

The hinged joint between the parts 14 and 16 serves in known manner to protect the blade 13 and stem 12 against excessive vertical forces the angular setting of the blades about the pivot rod 17 when in flight being determined by the resultant of the centrifugal and lifting forces.

What I claim is:

1. In a rotary wing aircraft, a rotor head, a plurality of rotor blade stems extending radially therefrom, means securing each stem to the rotor head for hinging movement about an axis at right angles to the axis of the rotor head, rotor blades, one for each stem, drag hinge pins securing the rotor blades pivotally to the stems, and shear members coupling the blades to the stems to positively prevent movement of the blades about their drag hinge pins until the drag forces set up are sufficient to fracture the shear pins.

2. In a rotary wing aircraft, a rotor head, a plurality of rotor blade stems extending radially therefrom, means securing each stem, at its inner end, to the rotor head for hinging movement about an axis at right angles to the axis of the rotor head, a pair of spaced lugs provided on the outer end of each stem and formed with pairs of aligned opening means of larger and smaller diameter, rotor blades, one for each stem, a plate like extension carried by each blade and fitting between the lugs of a stem, each plate like extension being formed with larger and smaller opening means corresponding in size and relative location to the opening means in the lugs, a drag hinge pin inserted in each set of aligned opening means and a shear member inserted in each set of aligned smaller holes in the lugs and plate like members, the shear members then positively preventing any movement of the rotor blades about their drag hinge pins until the drag forces set up are sufficient to fracture the shear members.

3. In a rotary wing aircraft, a rotor head, a plurality of rotor blade stems, means anchoring said stems to said rotor head so as to radiate therefrom, rotor blades one for each stem, means mounting said rotor blades respectively on said stems for pivotal movement about drag hinge axes extending in the same general direction as the axis of the rotor head, and shear members one for each rotor blade, each forming a positive and rigid connection between a rotor blade and its stem so as positively to prevent movement of the blade about its drag hinge axis until the drag forces set up are sufficient to fracture the shear members.

4. In a rotary wing aircraft, a rotor head, a plurality of rotor blade stems, means anchoring same stems to said rotor head so as to radiate therefrom, rotor blades one for each stem, means pivotally mounting said rotor blades respectively on said stems about drag hinge axes extending in the same general direction as the axis of the rotor head with portions of each blade and its related stem overlapped, said overlapped portions of each blade and its related stem being formed with apertures arranged to be in registry when the blade extends outwardly in direct continuation of its stem, and shear members one for each rotor blade engaged each in the registering apertures of the overlapped portions of the blade and its stem and serving positively to prevent movement of the blades about their drag hinge axes but being adapted to be fractured by excessive drag forces before such forces reach a magnitude sufficient to damage the blades of their stems.

References Cited in the file of this patent

UNITED STATES PATENTS

| | | |
|---|---|---|
| 1,244,945 | Bell | Oct. 30, 1917 |
| 2,023,840 | Kay et al. | Dec. 10, 1935 |
| 2,155,427 | Larson | Aug. 25, 1939 |
| 2,585,468 | Isacco | Feb. 12, 1952 |